(12) United States Patent
Holden et al.

(10) Patent No.: US 9,575,837 B2
(45) Date of Patent: Feb. 21, 2017

(54) SYSTEM AND METHOD FOR INTRODUCING FUNCTIONALITY TO AN APPLICATION FOR USE WITH A NETWORK SERVICE

(71) Applicant: UBER TECHNOLOGIES, INC., San Francisco, CA (US)

(72) Inventors: Paul-Phillip Holden, San Francisco, CA (US); Logan Rockmore, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 98 days.

(21) Appl. No.: 14/612,913

(22) Filed: Feb. 3, 2015

(65) Prior Publication Data

US 2016/0224426 A1    Aug. 4, 2016

(51) Int. Cl.
 G06F 11/00    (2006.01)
 G06F 11/14    (2006.01)
 H04L 29/08    (2006.01)

(52) U.S. Cl.
 CPC ........... G06F 11/1433 (2013.01); H04L 67/16 (2013.01)

(58) Field of Classification Search
 CPC .............................. G06F 11/1433; H04L 67/16
 See application file for complete search history.

(56) References Cited

U.S. PATENT DOCUMENTS

| | | | | |
|---|---|---|---|---|
| 7,370,336 | B2* | 5/2008 | Husain | H04L 41/0803 719/328 |
| 2003/0182411 | A1* | 9/2003 | Wang | G06F 8/65 709/223 |
| 2004/0060044 | A1 | 3/2004 | Das et al. | |
| 2005/0246701 | A1* | 11/2005 | Kanapathipillai | G06F 11/1433 717/168 |
| 2007/0006208 | A1* | 1/2007 | Nguyen | G06F 11/1433 717/168 |
| 2008/0168244 | A1* | 7/2008 | Chu Chen | G06F 11/1417 711/162 |
| 2008/0288767 | A1* | 11/2008 | Wang | G06F 11/1417 713/2 |
| 2009/0144827 | A1* | 6/2009 | Peinado | H04L 63/1433 726/25 |
| 2009/0222810 | A1* | 9/2009 | Walston | G06F 11/1433 717/172 |
| 2011/0078680 | A1* | 3/2011 | Lagergren | G06F 9/5077 718/1 |
| 2011/0307879 | A1* | 12/2011 | Ishida | G06F 8/68 717/170 |

(Continued)

FOREIGN PATENT DOCUMENTS

| | | |
|---|---|---|
| JP | 2006-065857 | 3/2006 |
| JP | 2014-052867 | 3/2014 |
| WO | WO0079390 | 12/2000 |

OTHER PUBLICATIONS

International Search Report and Written Opinion in PCT/US2016/016437 dated Jun. 13, 2016.

*Primary Examiner* — Joshua P Lottich

(74) *Attorney, Agent, or Firm* — Mahamedi IP Law LLP

(57) ABSTRACT

A computing device operates an application to receive and implement new functionality from a network service. If the new functionality causes the application to fail, the application can automatically discard or ignore the new functionality when the application is re-launched.

20 Claims, 8 Drawing Sheets

(56) References Cited

U.S. PATENT DOCUMENTS

| | | | |
|---|---|---|---|
| 2011/0320794 A1* | 12/2011 | Yang | G06F 8/665 |
| | | | 713/1 |
| 2012/0266169 A1* | 10/2012 | Lagergren | G06F 9/4401 |
| | | | 718/1 |
| 2013/0346796 A1* | 12/2013 | Niwa | G06F 11/1402 |
| | | | 714/15 |
| 2014/0040605 A1* | 2/2014 | Futral | G06F 9/445 |
| | | | 713/2 |
| 2014/0096126 A1 | 4/2014 | Gourlay et al. | |

* cited by examiner

SYSTEM AND METHOD FOR INTRODUCING FUNCTIONALITY TO AN APPLICATION FOR USE WITH A NETWORK SERVICE

BACKGROUND

Numerous network-based computing environments run updates, beta-tests, and experimental functionality using servers or remote computing resources. Given the diversity of computing environments, the manner in which computing devices respond to the introduction of new functionality can sometimes be unpredictable. With many conventional approaches, if an application is provided instructions and data for implementing new functionality, the application will re-launch with the new functionality still active. This results in the situation where the application repeats the failure, and can often lead to the application essentially becoming unusable. This can inconvenience the user, who may have to re-install the application.

DETAILED DESCRIPTION

Figure 1A:
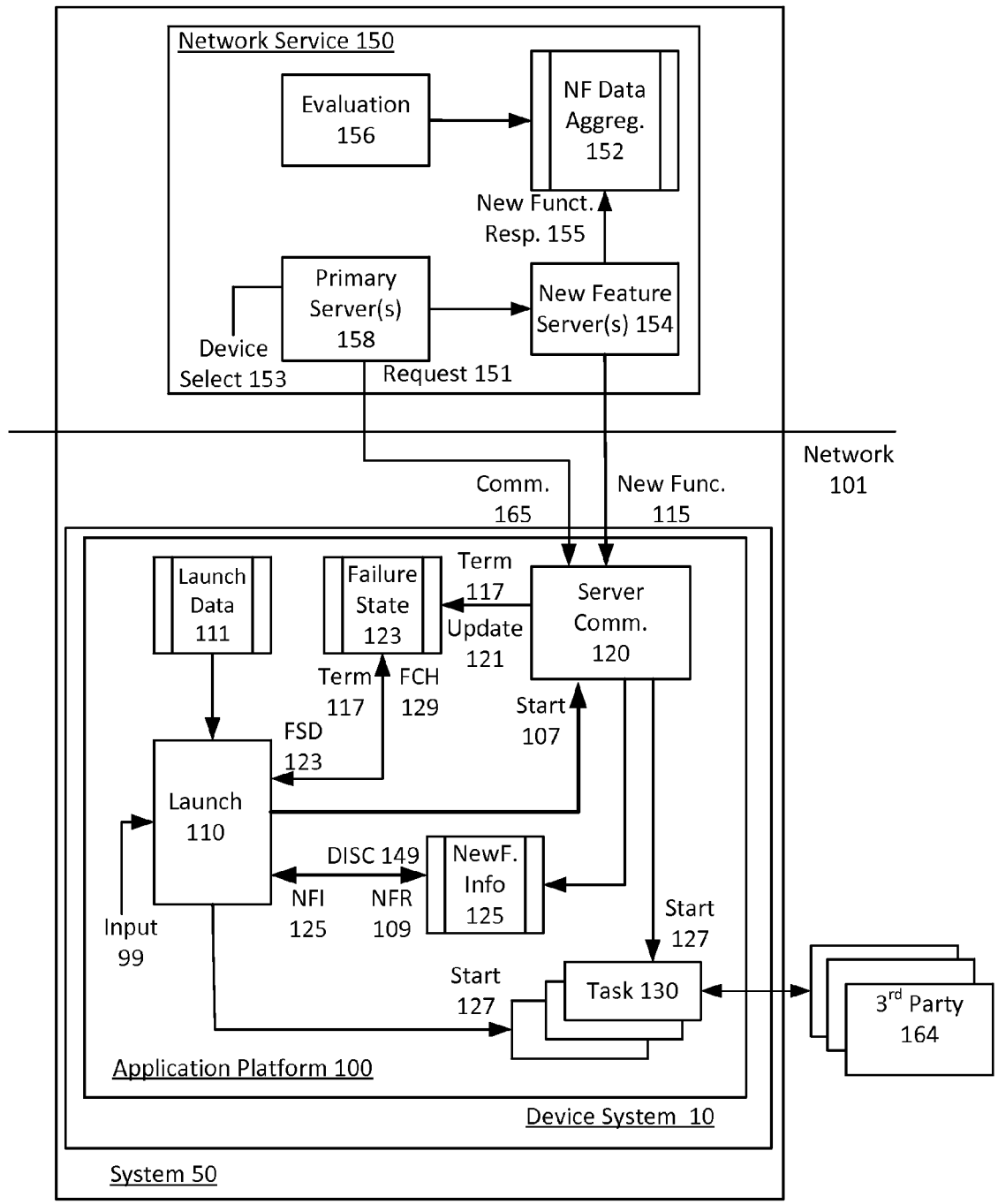
FIG. 1A illustrates an example of an application platform for safely implementing new functionality that is provided in connection with a network service, according to one or more embodiments.

According to some embodiments, a computing device operates an application to receive and implement new functionality from a network service. If the new functionality causes the application to fail, the application can automatically discard or ignore the new functionality when the application is re-launched. In this way, new functionality can be introduced to an application running on a computing device, and local resources of the application can be relied upon to discard or ignore the new functionality in the event the new functionality causes a failure on the computing device.

According to some embodiments, a computing device can operate to launch an application that is linked to a network service. When the application is launched, instructions are executed for initiating the application on the computing device, and for operating the application to communicate with one or more servers of the network service to receive instructions and data for implementing functionality of the network service. When communicating with the network service, the application can receive instructions for implementing new functionality for the network service. The application can further operate to store new functionality information to be accessible when the application is re-launched in order to initiate the computing device in executing the instructions for implementing the new functionality. One or more processes can be implemented on the computing device to monitor for and detect multiple types of application failures. In response to monitoring for an application failure, a data set is stored which is indicative of the application failure. Upon the application being re-launched, the computing device determines, based at least in part on the stored data set, that the application previously failed upon the instructions for implementing the new functionality being executed. The computing device can re-launch the application without accessing the new functionality information, so that the new functionality is not triggered.

Among other benefits, embodiments such as described enable a computing device to operate an application or application platform which can receive new functionality from a network service. Should the new functionality cause the application to fail, the computing device can automatically re-launch the application without the new functionality, so that the application remains operational.

Examples described herein can be implemented on numerous kinds of computing devices and platforms, including mobile computing devices such as cellular telephony/messaging devices, laptops or netbooks, multi-functional devices (e.g., tablets), and wearable computing devices. In some examples, new functionality can be provided in the form of an application update. By way of example, new functionality can be provided as experimental functionality, such as when a network service implements a beta-feature on a select number of devices from a larger population of devices that use the service. In this way, examples such as described promote and facilitate "A/B" testing, where new functionality is sampled onto a relevant population of users for evaluation and experimentation. Examples such as described mitigate much of the risk to the network service provider who initiates the experimentation, as the "worst-case" scenario for the user base can be limited to the user having to re-launch the application.

Embodiments further recognize that multiple types of application failures can occur when applications or application platforms are updated remotely. For example, mobile computing devices tend to differentiate amongst users in terms of the specific operating system used, the applications running on the devices, and the parameters or configurations used on the computing devices. This differentiation amongst mobile computing devices can cause some unpredictability in terms of how mobile computing devices respond to the introduction of new functionality for a particular application or application platform. Moreover, the mobility of such devices can cause further unpredictability in how the devices respond when new functionality is introduced on the computing devices.

According to some embodiments, a network service operates to provide an application to a population of computing devices operated by users, where each computing device of the population is operable to run the application to receive the network service. The application runs on each computing device to cause the application to (i) initiate on each computing device of the population, (ii) communicate over one or more networks with one or more servers that provide the network service, and (iii) perform tasks specified by the one or more servers. The network service can introduce a new functionality to the application on a given set of computing devices in the population. In particular, the network service can provide instructions with the new functionality to each computing device in the set. The instructions can include (i) new functionality instructions to cause the computing device to persistently store information for use when the application launches with introduction of the new functionality, (ii) failure detection instructions to cause the computing device to detect if launching the application with introduction of the new functionality causes the application to fail, (iii) default mode instructions that causes the computing device to implement a default mode re-launch process for the application that uses the stored information if launching the application with introduction of the new functionality is not detected as causing the application to fail on that computing device, and (iv) safe mode instructions that causes the computing device to implement a safe mode re-launch that omits use of the stored information if launching the application with introduction of the new functionality is detected as causing the application to fail on that computing device.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Application Platform and System Description

FIG. 1A illustrates an example of an application platform to safely implement new functionality that is provided in connection with a network service, according to one or more embodiments. In more detail, an application platform can include an application 100, or suite of applications and/or program(s) (e.g., plug-ins) that are installed on a computing device represented by the device system 10. In some examples, the device system 10 can correspond to a mobile computing device that is capable of wireless communication with one or more network sites on which aspects of a network service 150 is provided.

In an example of FIG. 1A, the application 100 and network service 150 operate as part of a network system 50. In particular, the application 100 may include dedicated components for communicating with and receiving data and instructions from the network service 150 over a network 101. As described with examples provided below, the application 100 can implement processes to receive functionality and data from the network service 150, and further to ensure that new functionality is received from the network service 150 and safely implemented on the device system 10. In this way, the introduction of new functionality does not cause repeated application failure on the device system 10.

Among other benefits, an example of FIG. 1A recognizes that the introduction of new functionality from the network service 150 can cause the application 100 to repeatedly fail at launch. Under conventional approaches, such failures can preclude the user from being able to enter input, manually uninstall the new functionality, or perform other steps that would recover the application. For example, under conventional approaches, the application can crash or hang on each subsequent startup as a result of the application implementing the new functionality at each instance. In such scenarios, the application becomes unusable. To further explain a typical conventional approach, the main recourse of the user is typically to delete or uninstall the application, and then reinstall the application (e.g., download the application from the application store). In contrast, an example shown with application 100 (and described in greater detail below) operates to detect multiple kinds of application failures that can affect subsequent usability of the application platform. When an application failure is detected in the context of receiving or implementing new functionality, the application 100 subsequently precludes itself from accessing the new functionality, so that the application can be continued in use with subsequent re-launches. In this way, the application 100 can self-fix itself in a manner that minimizes inconvenience or disruption to the user.

By way of example, the application 100 can be implemented when users of network service 150 are provided experimental features for purpose of evaluation and testing by the network service (e.g., beta or A/B testing). In providing experimental or beta testing functionality, the operator of network service 150 generally has to balance the risk of inconvenience to the select set of users which receive the experimental testing features, versus the need to enhance or improve the existing functionality provided by the network service 150 to applications (represented by the application 100) installed on a larger population of devices. An example such as provided by FIG. 1A mitigates the risk to an operator of network service 150 when introducing experimental or beta features, in that the inconvenience to the users receiving the new (e.g., experimental) functionality can be limited to the risk that the user (or computing device) may need to re-launch the application 100 after application failure, without the new functionality.

With further reference to an example of FIG. 1A, the application 100 includes launch process 110, server communication process 120, and one or more tasks 130. The application 100 can be initiated with, for example, user input 99, which initiates a sequence of application events. When the application events are successfully performed, the tasks 130 run to provide the intended functionality of the application 100. By way of example, the application 100 can be represented by an icon that can be selected (e.g., with user contact as input 99) to initiate the launch process 110, which in turn signals the start 107 to trigger the server communication process 120. The server communication process 120 communicates with network service 150 in order to receive service communication(s) 165, which can include content, functionality (e.g., instructions and/or application data), and data (e.g., real-time information, system or device configurations, etc.). The tasks 130 can be initiated with receipt of data and/or instructions provided with the communications 165, in order to enable user functionality and/or other operations.

According to some examples, the launch process 110 can utilize launch data 111 to initiate the sequence of the application 100. The launch data 111 can include launch instructions, a user identifier, session identifier, and/or configuration data (e.g., settings or preferences of the user). In an example of FIG. 1A, the launch data 111 can be associated with a primary functionality or service of the network system 50. Accordingly, the launch data 111 can represent data and instructions which are always accessed by the launch process 110 when the launch process is initiated.

The server communication process 120 can be signaled to initiate communications with the network service 150. The server communication process 120 can, for example, generate a request 151 for service or information from network service 150. In providing the request 151, the server communication process 120 can include information such as the session identifier, user identifier, or other information (e.g., location information for on-demand service, specific request of user, etc.). The network service 150 can respond to the request 151 by issuing a response as another server communication 165. In an example of FIG. 1A, the response provided as one of the communications 165 can be accompanied by new functionality instructions 115.

In some examples, the network service 150 can select individual computing devices (or users) to receive new (e.g., experimental) functionality which are to be implemented by the new functionality instructions 115. The selected computing devices can receive the new functionality instructions 115 when, for example, the selected devices launch the application 100. The selection of the set of devices (or users) can be based on, for example, geographic information, user usage data (e.g., frequent users), user type of class, and/or other parameters (e.g., random determination). For example, the server communication process 120 can receive the new functionality instructions 115 from the network service 150 when the application 100 is operated in its everyday normal use, or alternatively, when the application 100 is triggered to make the request 151 for service or information from the network service 150. In some variations, the launch process 110 and the server communication process 120 combine to execute the new functionality instructions 115, in order to implement new functionality specified by the network service 150. In addition to executing the new functionality instructions 115, the server communication process 120 can store new functionality information 125, which can include the new functionality instructions 115 (or instructions that are determined from the new functionality instructions 115), and/or data such as configurations or settings used in executing the new functionality instructions 115. In particular, the new functionality information 125 can include instructions or data required for initiating execution of the new functionality instructions 115, independent of other processes that run on the application 100.

When the new functionality instructions 115 is executed for the first (or alternatively subsequent) instance, the components and processes of the application 100 implement functionality to monitor for multiple types of application failures. According to examples, the launch process 110, the server communication process 120 and/or the tasks 130 can monitor for and detect (i) the application 100 unexpectedly terminating (e.g., "crashing"), (ii) the application 100 entering a state of suspended and/or nonresponsive operation (e.g., "hanging"), and/or (iii) aspects of core functionality of the application 100 failing (e.g., an input mechanism of the device system 10 becoming disabled). In an example FIG. 1A, the launch process 110, the server communication process 120 and/or the tasks 130 each record data items in a failure state store (e.g., referred to herein as failure state data 123) which are indicative of a type of application failure having occurred (e.g., as described with an example of FIG. 2). For example, each of the launch processes 110 or the server communication process 120 can record a termination event 117 in the failure state store, corresponding to the process detecting the application terminating. Additionally, the server communication process 120 can signal an update 121 that indicates whether, for example, the application 100 completed a threshold or stage of progression when the application 100 was started with the new functionality being implemented. In this way, the failure state data 123 can record application failures resulting from the initial implementation of the new functionality instructions 115. The failure state data 123 can be persistently stored as a mechanism that can be subsequently accessed when the application 100 is re-launched.

Additionally, in some variations, the launch process 110 can record the presence of the new functionality information 125 for when the application 100 is re-launched. The new functionality information 125 can provide an independent data/instruction set that enables the launch process 110 to either trigger implementation of the new functionality with the application 100 start, or to omit the new functionality when the application 100 starts.

When the application 100 is re-launched, the launch process 110 can check to determine whether a previous session of the application 100 resulted in the receipt of new functionality. In an example of FIG. 1A, the launch process 110 can check in order to determine whether new functionality was received (e.g., new functionality instructions 115) during a previous session. If new functionality was received, the launch process 110 can perform a failure check 129 ("FCH 129") to receive failure state data 123. The failure state data 123 may include data items that are indicators of application failures (e.g., application previously crashing or hanging). If the failure state data 113 indicates that the previous session of the application 100 resulted in an application failure, then the launch process 110 can discard 149 (or ignore) the new functionality information 125, so that the new functionality is not implemented on the re-launch. On the other hand, if the failure state data 123 indicates that the previous session of the application 100 resulted in no application failure, then the launch process 110 can generate a new functionality request 109 ("NFR 109") to retrieve the new functionality information 125 ("NFI 125"). In this way, the new functionality information 125 is only retrieved when the launch process 110 performs the failure check 129 for an application failure in the prior session. The new functionality information 125 can be utilized by one or multiple components of the application 100 in the current session.

While an example of FIG. 1A provides that the new functionality instructions 115 are executed during the startup process when the instructions are received, variations further provide for the failure check 129 to be determined for a subsequent session or set of sessions. For example, the server communication process 120 can receive the new functionality instructions 115 in a first application session, and then execute the new functionality instructions 115 for the first time on the first re-launch. In such an example, the failure check 129 can relate to the first instance when the new functionality instructions 115 are used in an attempt to implement the new functionality. As another example, implementation of the new functionality instructions 115 can be monitored for application failure over several application sessions, such as when parameters used with implementation of the new functionality instructions 115 are dynamic (e.g., device Global Positioning System (GPS) information). In such cases, the new functionality implementation can be evaluated at multiple instances for each user to ensure stability and safe re-launch. The determination as to the length of time or as to the number of sessions in which the new functionality instructions 115 is used before the failure check 129 is stopped can be determined by, for example, administrator settings, application settings, or parameters provided by the new functionality instructions 115.

According to some variations, the network service 150 can distribute new functionality instructions 115 to the application 100 running on select device system 10 in order to collect or aggregate information about the use or implementation of new functionality instructions 115 on individual device system 10. For example, a set of primary servers 158 can provide the primary service for network service 150. When an operator of the network service 150 generates the new functionality instructions 115, device selection logic 133 can be used to select a set of device systems 10 from a larger population of device systems that are operated by users of the network service 150. In some variations, a dedicated server or network resource can be used to deliver the new functionality instructions 115 to the selected device system 10. For example, one or more new feature servers 154 can be used to issue the new functionality instructions 115. When the application 100 successfully implements new functionality provided by the new functionality instructions 115, the tasks 130 can, for example, operate to report feedback to the network service 150. The feedback can include, for example, performance data, user information or various other kinds of data generated from the introduction of new functionality (collectively "new functionality response data 155"). The network service 150 can store the new functionality response data 155 as part of a data aggregation 152. The network service 150 can utilize an evaluation component 156 in order to evaluate the new functionality response data 155, as well as other information that is provided or otherwise obtained from the various device systems operated by users of the network service 150.

In some embodiments, the network service 150 configures the application 100 to proactively handle external events or conditions which can cause the new functionality instructions 115 to fail on execution. In particular, the network service 150 can instruct the application 100 to handle failure(s) which may occur with the new feature server(s) 154. For example, if the new feature server(s) 154 fails, the new functionality instructions 115 cannot be effectively executed on device system 10.

Likewise, the new functionality instructions 115 can trigger or require use of a particular third-party service 164. As described below, the network service 150 can configure the device system 10 to proactively handle the third-party service 164 being unavailable or inaccessible to the device system 10 when the new functionality instructions 115 is executed.

Figure 1B:
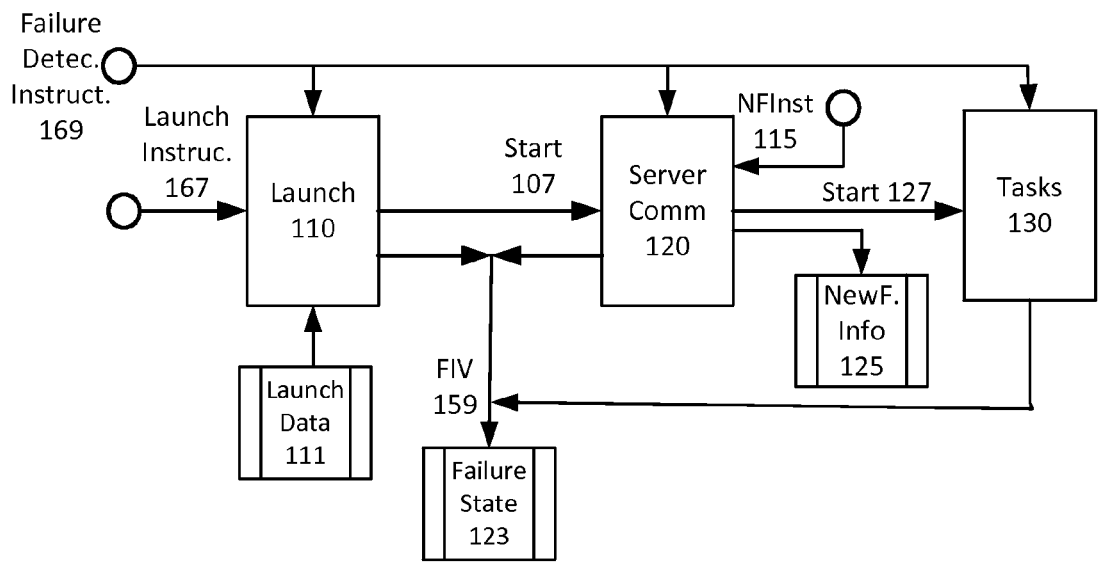
FIG. 1B illustrates a process in which an application receives and processes new functionality instructions to ensure the application can be safely re-launched, according to one or more embodiments.
Figure 1C:
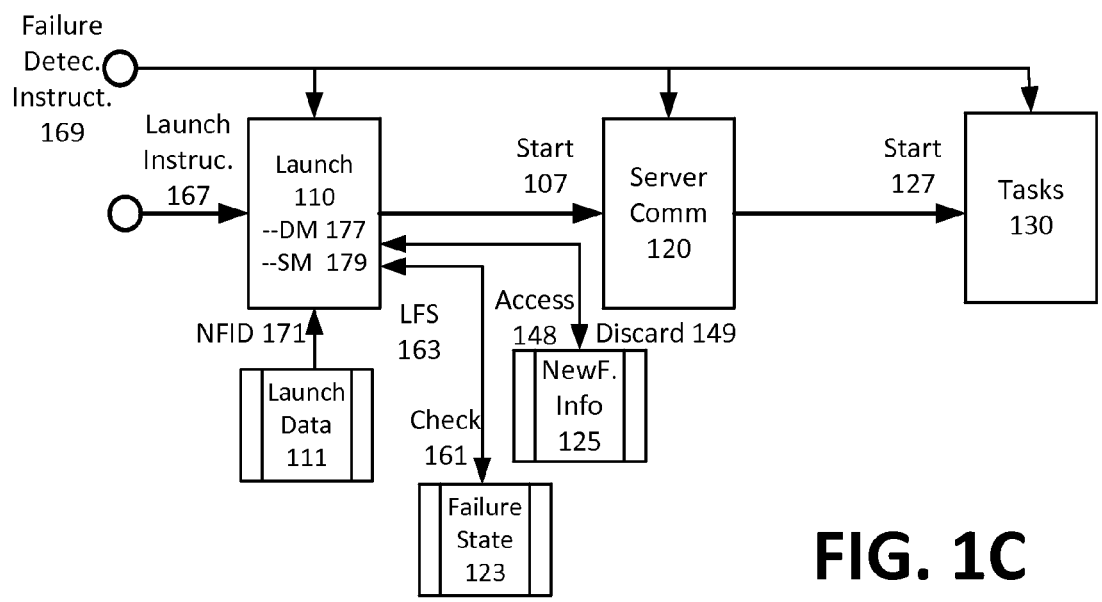
FIG. 1C illustrates a process in which an application is able to safely re-launch after receiving instructions or implementing the new functionality, according to one or more embodiments.

FIG. 1B illustrates a process in which the application 100 receives and processes the new functionality instructions 115 to ensure the application 100 can be safely re-launched when the introduction of new functionality is attempted. FIG. 1C illustrates a process in which the application 100 is able to safely re-launch after receiving instructions for implementing the new functionality.

With reference to FIG. 1B, the launch process 110 is implemented using launch instructions 167, which can be provided or otherwise received from a network service at a prior moment of time (e.g., with download of the application 100 from an application store or with an update of the application 100 delivered over-the-air). The launch process 110 uses launch data 111 to initiate, and provides the start signal 107 to the server communication process 120. The server communication process 120 receives the new functionality instructions 115 from the network service 150. According to one implementation, the application 100 initiates execution of the new functionality instructions 115 in the same session when the new functionality instructions 115 are received. In variations, the application 100 initiates execution of the new functionality instructions 115 in the next session after when the new functionality instructions 115 are received, or still further upon the occurrence of another condition (e.g., restart of the device system 10, the device system 10 moving into a particular geographic zone, the device system 10 receiving a data set from another source, etc.). In one implementation, if the new functionality instructions 115 are introduced successfully, the server communication process 120 signals the start 127 to the tasks 130, which completes or advances the progression of the application 100 during the startup.

When the server communication process 120 receives the new functionality instructions 115, the server communication process 120 can store the new functionality information 125 for subsequent use in order to implement the new functionality. The new functionality information 125 can be stored in persistent memory, such as in the data store available to the application 100. As described with examples, the new functionality information 125 can enable selective implementation of the new functionality by the application 100, based on the determination of whether any application failure occurred when there was a previous attempt to implement the new functionality.

The processes of the application 100 can include failure detection processes, which is implemented using failure detection instructions 169, to monitor and detect different kinds of application failures from one or more multiple processes of the application 100. For example, the application 100 can terminate unexpectedly, or the application 100 can suspend its operations before the tasks 130 are initiated. According to some examples, the failure detection instructions 169 can execute to detect unexpected application termination (e.g., application "crash") at any point in a sequence from when the new functionality instructions 115 is received and executed until the tasks 130 are initiated and run. The failure detection instructions 169 can also execute on, for example, the server communication process 120 in order to generate indication of when the application 100 "hangs" after new functionality instructions 115 is executed. As described with an example of FIG. 1B, the application 100 can include data items, such as a token, which by default is set to an initial value that indicates the occurrence of a particular failure, such as the application 100 failing to complete a startup process or progression towards completing its launch. The failure detection instructions 169 can provide that when execution of 100 application 100 reaches a particular stage or condition (e.g., initiation of tasks 130), the value of the token or other data item is reversed or reset, at which point the value no longer indicates the occurrence of the particular type of application failure. By way of example, the failure detection instructions 169 can include instructions to detect when the startup process of the application 100 fails to reach initiation of the tasks 130.

As another example, the failure detection instructions 169 can include instructions to detect when the application 100 initiates the tasks 130, but the implementation of the new functionality results in a significant or material disability or degradation of the application 100 or application functionality. For example, the failure detection instructions 169 can establish a data item (e.g., a message or a token) having a value that indicates a particular kind of diminished functionality (e.g., touchscreen of devices inactive). Until the particular functionality can be validated as being present (e.g., user makes contact with screen to provide input), the value of the data item can be maintained to indicate the problem. Once the functionality is validated as being present when the new functionality instructions 115 is executed (e.g., user provides input through the touchscreen), the value to the data item can be reversed to indicate that new application failure was detect. The various values (collectively "failure indication values 159" or "FIV 159") that are either generated by default or reversed with successful progression of the application 100 through stages can be stored in or as part of failure state data 123.

With reference to FIG. 1C, the application 100 can re-launch at a subsequent instance after attempting to initially execute the new functionality instructions 115. When the application 100 is going through a startup process corresponding to the progression of stages (e.g., illustrated by execution of the launch process 110, the server communication process 120, and the tasks 130), the application 100 can perform a failure check 161 to determine whether a prior instance of the application 100 caused failure (e.g., during startup). The launch process 110 can be implemented with launch instructions 167, and with use of launch data 111. In some examples, the launch data 111 can include new functionality indication data 171 ("NFID 171") that indicates whether or not the prior instance of the application 100 included receipt of new functionality instructions 115. In one example, the application 100 can store a flag or token value with the launch data 111 to provide a Boolean indication of whether new functionality was received or otherwise successfully implemented on the application 100. If new functionality is determined to have been received, the launch process 110 can perform the failure check 161. The failure check 161 can determine, from the failure state data 123, the fail state of the last session ("LFS 163").

If the fail state 163 of the last session indicates the application 100 failed, the launch process 110 can initiate safe mode 179. In the safe mode 179, the launch process 110 can discard 149 or otherwise ignore new functionality information 125. If the fail state 163 of the last session indicates no application failure, then the launch process 110 can implement the default mode 177. In the default mode 177, the launch process 110 accesses 148 new functionality information 125, and implement the new functionality. Each of the default mode 177 and safe mode 179 can be implemented using an instruction set received from the network service 150.

In variations, the new functionality, as implemented by new functionality information 125, can be integrated or otherwise made a part of the application library (not shown) for the application 100. Alternatively, when the new functionality is deemed safe, it can be packaged as an update to the application 100. This allows for the new functionality, as provided through receipt of new functionality instructions 115, to be available as a feature of the application 100.

Methodology

Figure 2A:
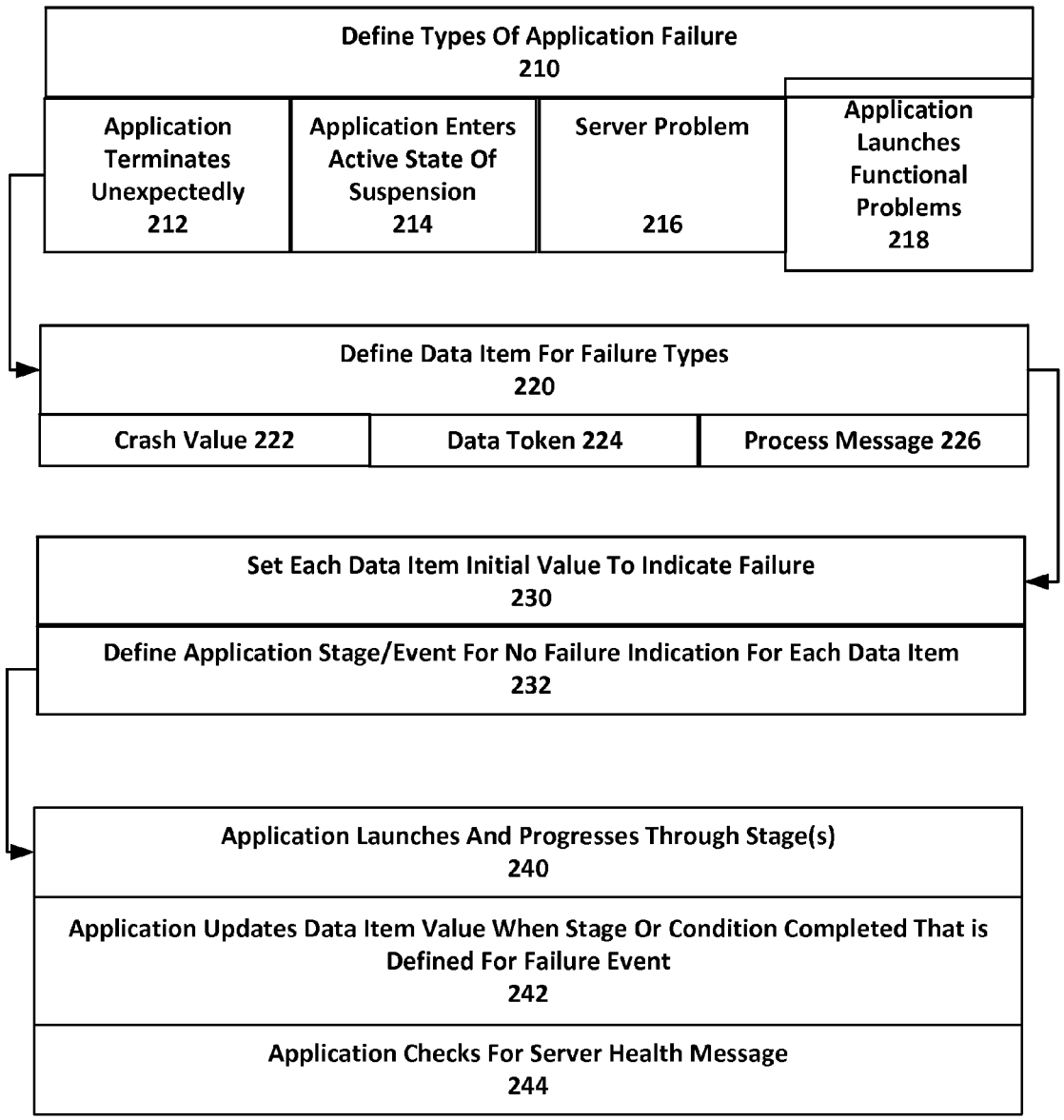
FIG. 2A illustrates an example method for detecting and communicating the occurrence of multiple types of application failures amongst different sessions of the application being executed, according to one or more embodiments.
Figure 2B:
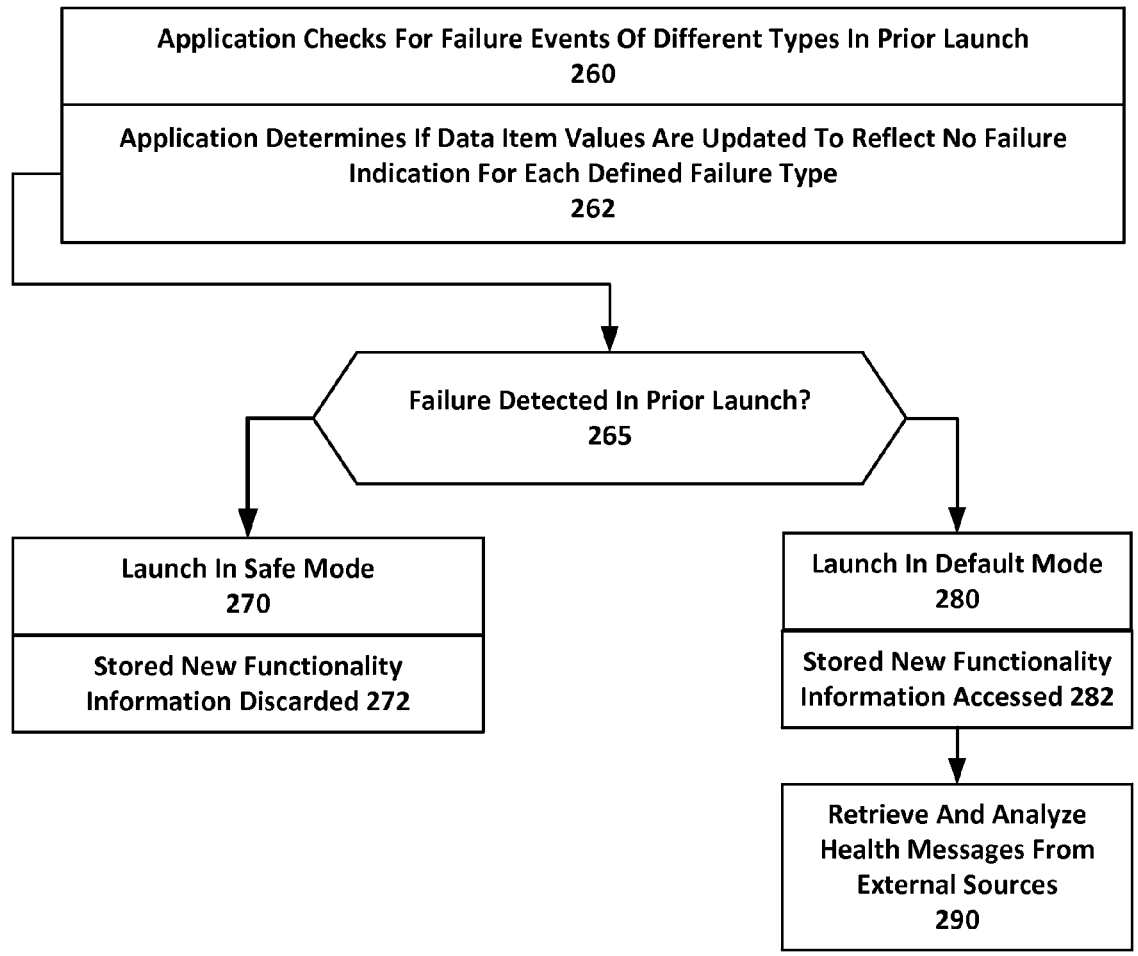
FIG. 2B illustrates an example method for determining whether one or more types of application failures occurred in a prior session of the application, according to one or more embodiments.
Figure 3:
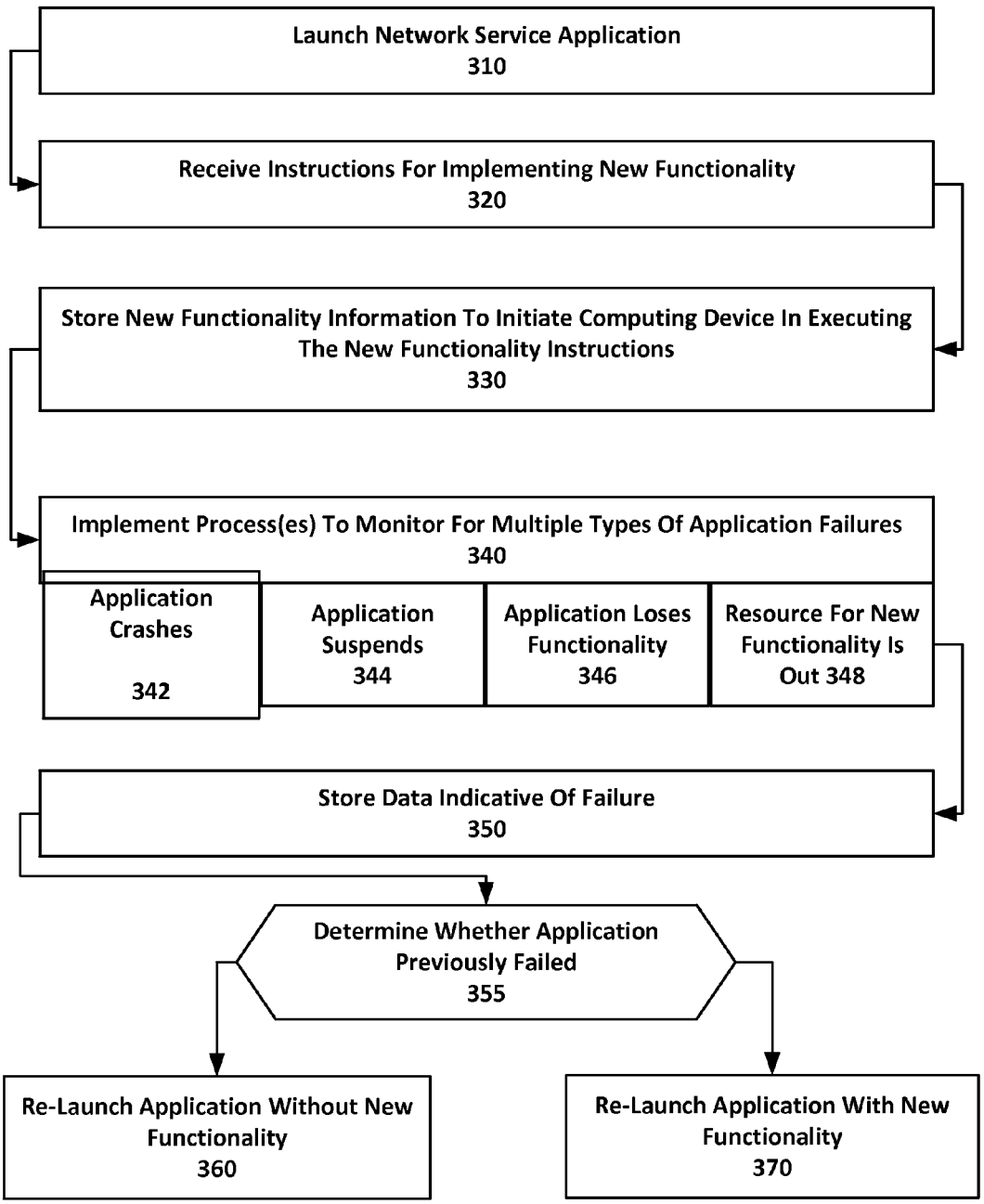
FIG. 3 illustrates an example method for operating an application to enable new functionality to be safely received, according to one or more embodiments.
Figure 4:
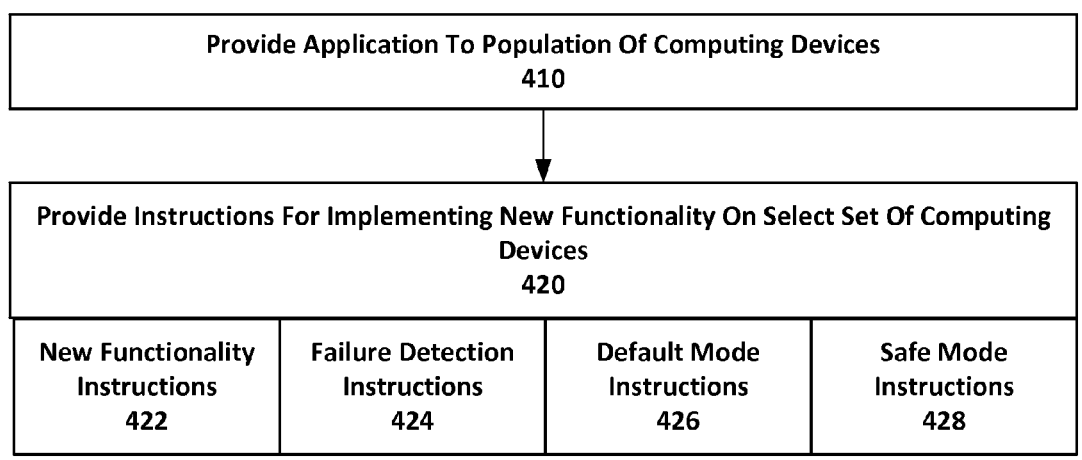
FIG. 4 illustrates an example method for operating a network service in order to enable a corresponding client application to safely receive new functionality, according to one or more embodiments.

FIG. 2A illustrates an example method for detecting and communicating the occurrence of multiple types of application failures amongst different sessions of the application being executed, according to one or more embodiments. FIG. 2B illustrates an example method for determining whether one or more types of application failures occurred in a prior session of the application, according to one or more embodiments. FIG. 3 illustrates an example method for operating an application to enable new functionality to be safely received, according to one or more embodiments. FIG. 4 illustrates an example method for operating a network service in order to enable a corresponding client application to safely receive new functionality, according to one or more embodiments. In describing example methods of FIGS. 2A through 4, reference may be made to elements of FIG. 1A through FIG. 1C for purpose of illustrating suitable components for performing a step or sub-step being described.

With reference to FIG. 2A, multiple types of application failures can be defined (210). For example, a network service 150 can generate programming instructions that can define application failures of different types. The failure detect instructions 169, for example, can be integrated into the process flow of the application 100 when the application 100 is started. For example, application failures can include an application terminating unexpectedly (212). In some variations, the definition of this event as an application failure can be limited to the occurrence of the event during the startup process, before, for example, the application 100 reaching a designated stage or phase (e.g., a phase that is deemed to be past the point of start-up).

Another type of application failure can correspond to an application entering an active state of suspension, meaning that the application ceases progressing or interacting with the user, or otherwise performing the application's designated function or purpose (214). With reference to an example of FIG. 1B or FIG. 1C, for example, this failure may occur when the application 100 does not terminate, but fails to initiate the tasks 130 after the server communication process 120 receives communications 165 from the network service 150.

Another type of problem that can be defined for detection includes a failure by an external server or resource required by the application 100 during, for example, the startup process (216). For example, with reference to FIG. 1A, the new feature server 154 may fail, in which case the application 100 can crash or hang even when the new functionality instructions 115 execute as triggered. Likewise, the new functionality instructions 115 can require use of a third-party resource 164, and if the third-party resource 164, the application 100 can also fail. In the latter case, the failure can occur after the startup process, or when a corresponding task 130 is initiated.

Still further, the application failure can correspond to some functional aspect of the application 100 or device system 10 failing to operate correctly once the new functionality information 125 is implemented on the application 100 (218). For example, the new functionality information 125 can provide the new functionality, but result in some operational problem that diminishes the functionality of the application 100 or the device system 10.

According to some examples, a data item (or set thereof) can be defined to detect the occurrence of one or multiple kinds of application failures (220). In some variations, a data item is defined for each type of application failure, while in other variations, a single set of data items can be applicable to indicate the presence of multiple kinds of application failures. By way of example, the data items can include (i) a Boolean value indicating the presence of an application crash (222), (ii) a token or token value which indicates the occurrence of another kind of failure, such as the application handing or failing to progress during startup (224), and/or (iii) process messages (226), such as inter-process messages exchanged between processes of an application or set of applications to indicate the presence of another kind of failure (e.g., failure of an external resource to be available).

One or more of the data items which reflect particular kinds of application values can be set to indicate a failure as an initial value (230). For example, a token value can include an initial value that indicates the application 100 entered a state of suspension. Alternatively, a message value can indicate an external resource (e.g., server) failed to communicate a health message and may be down. In providing the initial value, the application stage or event by which the positive value (indicating failure-occurred) is reversed can also be defined (232). For example, the application 100 can be deemed to not have "hanged" if it completes the startup progression to the point where the tasks 130 are initiated and operational.

Likewise, the use of the tasks 130 can represent the stage or condition for determining when functional problems have not resulted on the application 100 or the device system 10 as a result of the device system 10 implementing the new functionality. A message or token value can be associated with the occurrence of different functional milestones (e.g., receipt of user input, etc.) which can correspond to pre-defined potential problems indicating performance or functional degradation. The message or token value can indicate the failure or performance degradation, until the performance or functional milestone is reached, in which case the value of the message or token is reversed to indicate no failure. Such a determination can indicate that the functionality and performance of the application 100 or 10 device system 10 is not affected implementation of the new functionality.

Accordingly, the application 100 can launch or otherwise execute new functionality instructions 115. When the new functionality is introduced, the application 100 can, for example, perform a complete or partial startup process that progresses through stages (240). The completion of the stages can signify an event or condition indicating that a particular type of application failure did not occur.

According to some embodiments, the application 100 can update the data item value that is defined for particular type of application failure when the stage or condition that is pre-defined for that application failure is completed by the startup process of application (242). Thus, for example, when one or more tasks 130 are initiated, the token or token value indicating that the application has hanged can be reversed or otherwise changed in value to indicate that the application completed the startup. Likewise, when the application 100 initiates the tasks 130 to be functional so that different functional or performance milestones are reached with use of the application 100, the token or message values indicating functional or performance degradation failure can be reversed. In this way, the occurrence of certain application failures is assumed, unless the process of the application is able to reverse the assumption. Such an approach ensures that the application failure will not preclude the application 100 recording data that indicates the application failed when the application is re-launched.

As an addition or alternative, the application 100 can set a data item vale (e.g., message value) to indicate a particular resource that is needed with the implementation of the new functionality information 125. At startup (e.g., when the application launch process 110 is initiated), the application 100 can initiate a request to, for example, a requisite external resource, and the response to the request can correspond to a health message (244). If the health message arrives before predetermined point in the operation or startup of the application, then the resource is deemed available, and not an anticipated source of failure the launch of application 100 with new functionality information 125. If the health message does not arrive before the predetermined point, then the resource can be deemed to not be available, in which case the new functionality information 125 can be either discarded or ignored (e.g., made active on subsequent session). In contrast to other failure detections, however, the messaging process described for determining the health of requisite external resources can be implemented during the launch or startup process of a current session of the application 100. Thus, the determination of (244) can be based on the current application session, and not the prior session.

With reference to FIG. 2B, the application 100 checks for failure events in different types prior to re-launching with the existence of new functionality information 125 (260). The application 100 can be triggered to check for failure events when a flag or other setting indicates that the prior session of the application resulted in the receipt of new functionality instructions. For some types of failures, the application 100 can determine if the data item values that are defined for specific failure types are updated to reflect that no failure occurred for the corresponding failure types (262). Thus for example, the application 100 can determine whether the token or token value exists indicating that the application hanged.

A determination can then be made as to whether a particular type of failure was detected in the prior launch of the application 100 when, for example, the new functionality instructions 115 were first received from the service (265). If the determination is that a particular type of failure occurred, then the application 100 is launched into safe mode (270). In the safe mode, the new functionality information 125 can be discarded or ignored (272). In some variations, the new functionality information 125 can be ignored if, for example, the type of application error indicates a potential temporary issue. Alternatively, the new functionality information 125 can be deleted or otherwise made unusable to the processes of the application 100, so as to preclude repeat of the application failure which may have occurred in the prior session.

If the determination is that no type of application failure occurred, then the application 100 can be launched in the default mode of operation (280). In the default mode, the new functionality information 125 can be accessed and utilized to implement the new functionality as part of the application output (282). For example, the new functionality instructions 115 can be integrated with or otherwise incorporated into the application library of the application 100.

In some variations, when no application failures are detected from the prior application session, health messages are retrieved or otherwise analyze from external sources that are utilized by the application 100 (with the new functionality) in order to ensure that the implementation of the new functionality information 125 does not cause an application failure that would not otherwise occur (290). The health messages, or other values or information obtained from external or third-party sources 164, may indicate such resources are unavailable to implement the new functionality, in which case then the new functionality can be discarded or ignored. If ignored, the new functionality can be accessed when the application 100 is re-launched.

With reference to FIG. 3, a network service application (e.g., application 100) can be launched on device system 10 (310). When launched, the application 100 can receive instructions for implementing new functionality (320). As described with other examples, the new functionality can be experimental (e.g., such as provided with A/B testing). New functionality information 125, which includes or is based on the new functionality instructions 115 as received from the network service 150, can be persistently stored on the device system 10 (330).

When the new functionality is received, it can be implemented with the application startup process. Alternatively, the new functionality can be implemented in a subsequent re-launch of the application 100. In either case, when the new functionality is implemented for the first time, one or more processes can be implemented to monitor for one or many types of application failures (340). These failures can include the application terminating unexpectedly (342), the application suspending operations in an active state (or "hanging") (344), the application 100 or device system 10 losing functionality (346), or failures in one or more resources of the device system 10 that are used by the new functionality or the application 100 (348).

Data that is indicative of the monitored one or many types of application failure can be stored for a subsequent session of the application 100 (350). The stored data can indicate an update to a value which would otherwise indicate the presence of the failure. For example, the initial value of a token can represent that the application has hanged, and the data that is stored in this step can remove or reverse the value of the token to indicate that prior session of the application did complete to a particular stage that is defined to mean that no application failure occurred.

The stored data can be used in making a determination as to whether the application previously failed (355). If the determination is that the application 100 previously failed with the introduction of the new functionality, the application 100 can be re-launched without the new functionality being triggered (360). For example, the new functionality information 125 needed in order to implement the new functionality can be discarded or ignored for the particular session of the application. If the determination is that the application 100 previously ran with the new functionality and did not suffer a known application failure, then the application can be re-launched with the new functionality (370). For example, the new functionality information 125 can be accessed and utilized in order to integrate the new functionality with the setup process of application 100.

With reference to FIG. 4, network service 150 can operate to provide the application 100 to a population of computing devices and users (410). The application 100, for example, can be distributed to include a startup process of sequence, in which local data is accessed first, followed by network data, followed by the implementation of tasks which can include high-level operations, local data and/or user interaction.

In providing the application 100, the network service 150 can enable the application 100 to implement new functionality provided through the network service 150 (420). The network service 150 can selectively distribute the new functionality to a select set of devices from a larger population of devices that access the system. For example, the network service 150 can roll out new functionality in a progressive manner, so that some users or devices receive the functionality before others. The progressive rollout enables the network service 150 to minimize problems early, before the population of users is affected. In other variations, the new functionality can be provided as a beta or experimental basis. Still further, the new functionality can be provided as an update to the core functionality of the application 100.

The new functionality instructions 115 can be provided to the application 100 of the various selected device (422). For example, new functionality instructions 115 can be communicated to the applications 100 that are selected to receive and implement the new functionality. Each application 100 can also receive failure detection instructions 169, to enable the device system 10 on which the application 100 runs to detect one or multiple kinds of application failures (424). Still further, the application 100 can be provided with the instructions for implementing the default mode 177 (426). The default mode instructions 177 can provide for the application 100 to access and use new functionality information 125 on startup, so that the application launches with the new functionality. Additionally, the application 100 can be provided with safe mode instructions 179, in which a new functionality is purposely discarded or ignored, based on a determination that a prior use of the functionality resulted in an application failure (428).

In variations, the safe mode instructions 179 can discard or ignore the new functionality information 125 when, for example, necessary or requisite external resources of the application 100 (when otherwise implemented new functionality) are deemed to be unavailable during that current application session. For example, with reference to FIG. 1A, when the launch process 110 initiates, the launch process 110 or server communication process 120 can signal a message to new functionality server 154 and/or third-party resource 164 in order to determine the health of those resources. If the health messages indicated the resources are unavailable, the safe mode instructions 179 can provide that the new functionality information 125 is discarded or ignored. Still further, in other variations, the new functionality information 125 can be stored until the external sources are available again.

Hardware Diagram

Figure 5:
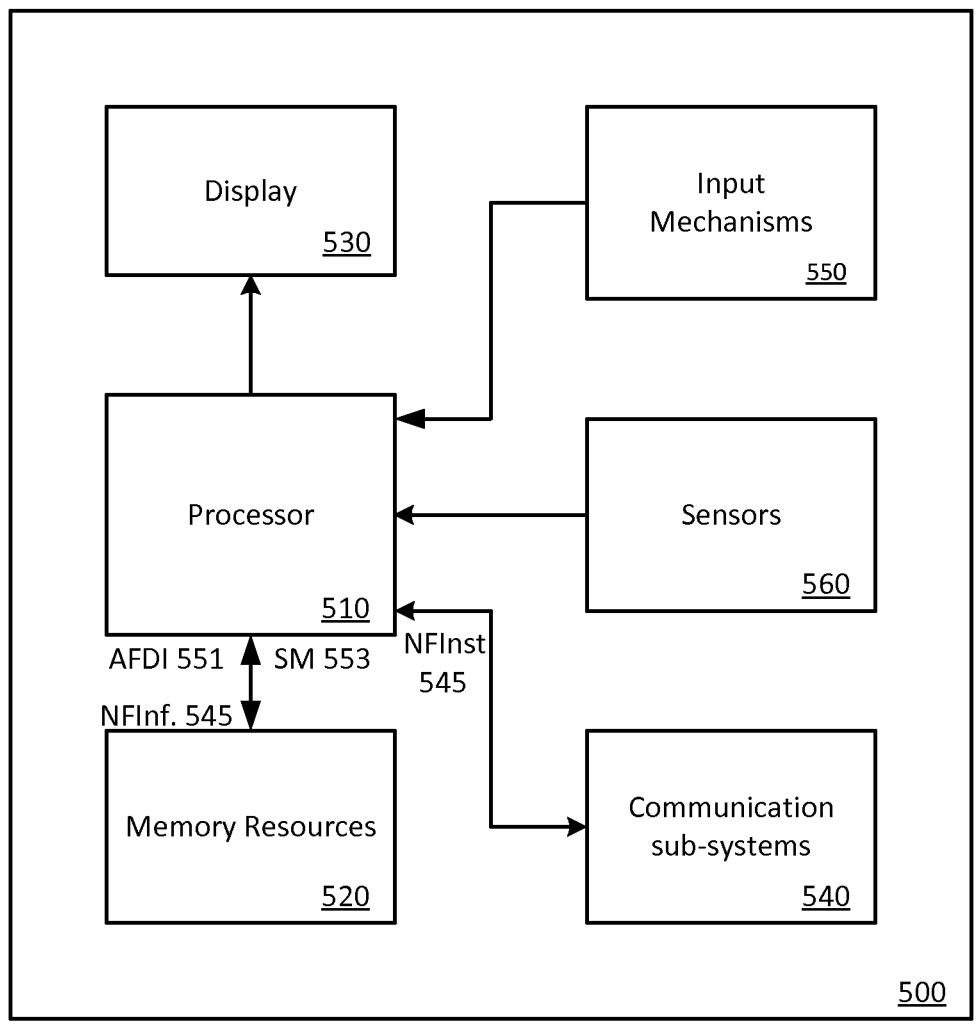
FIG. 5 is a block diagram that illustrates a device system upon which examples such as described herein may be implemented.

FIG. 5 is a block diagram that illustrates a mobile computing device upon which examples described herein may be implemented. In one example, a mobile computing device 500 may correspond to a device that can roam and utilize a local wireless network (e.g., home network with Wi-Fi access point) and/or wireless wide area network (e.g., cellular). Accordingly, in some variations, the mobile computing device 500 may be capable of cellular voice or data usage, such as used for telephony, messaging, and/or data services. By way of example, the mobile computing device 500 can correspond to a smartphone, multifunctional device, tablet, wearable computing device, netbook or laptop. In an example of FIG. 5, the mobile computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors 560 (e.g., location detection mechanisms such as GPS component). In one example, at least one of the communication sub-systems 540 sends and receives cellular data over data channels and voice channels.

The processor 510 can be configured with software and/or other logic to perform one or more processes, steps and other functions described with implementations, such as described by FIGS. 1A through 1C, and example methods of FIG. 2A through FIG. 3. The processor 510 can be configured, with instructions and data stored in the memory resources 520, to operate application 100 as described by FIGS. 1A through 1C, and example methods of FIG. 2A through FIG. 3. For example, the processor 510 can receive new functionality instructions 545 ("NFInst 545") from the network service 150 (FIG. 1A). The processor 510 can also retrieve application failure detection instructions 551 ("AFDI 551") to determine if implementation of the new functionality instructions 545 causes an application failure. The processor 510 can also include safe mode instructions 553 ("SM 553") in which the new functionality instructions 545 are discarded or ignored based on the output of the application failure detection instructions 551, when, for example, the new functionality is first implemented.

Figure 6:
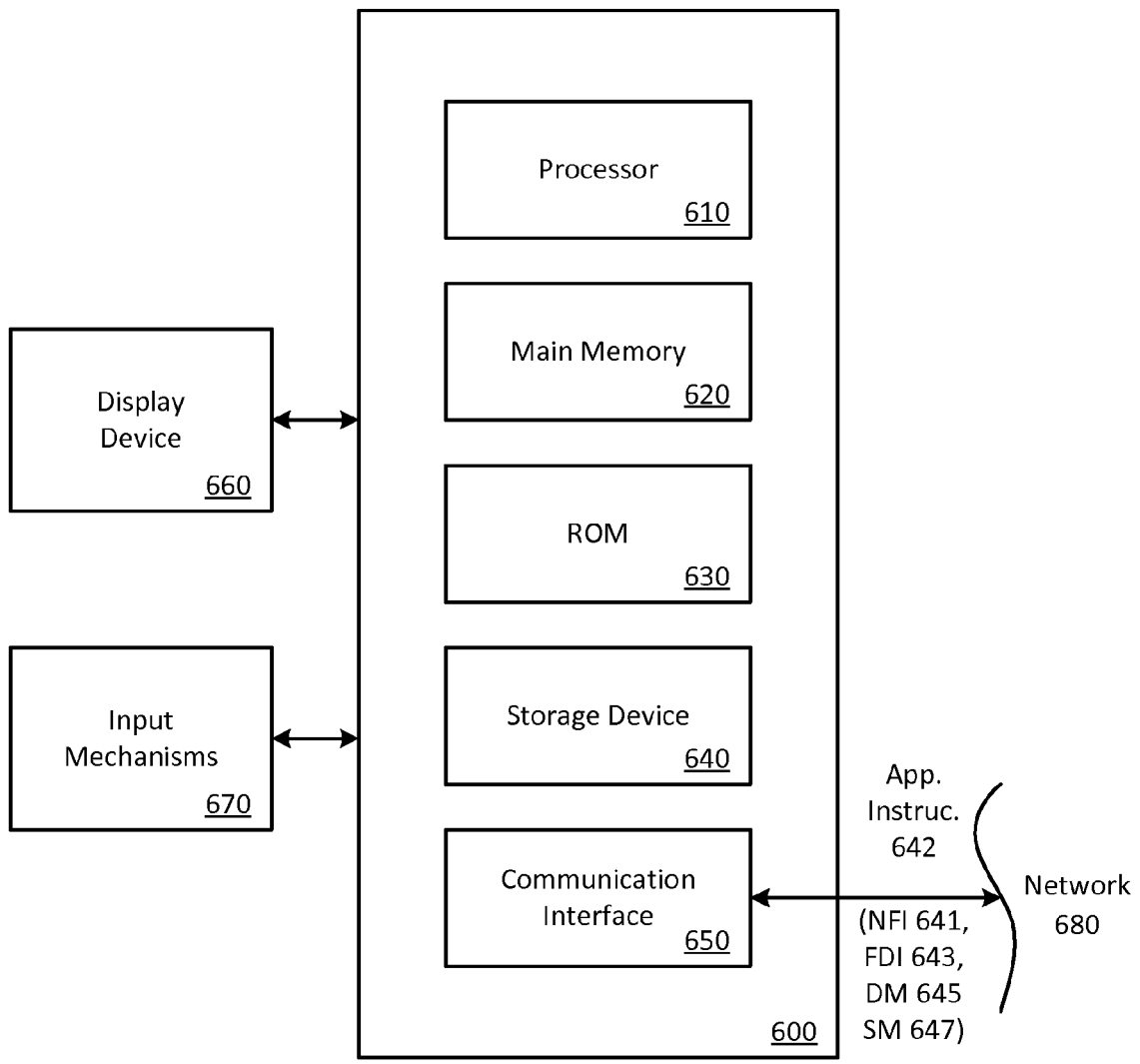
FIG. 6 is a block diagram that illustrates a computer system upon which a network service such as described herein may be implemented.

FIG. 6 is a block diagram that illustrates a computer system upon which a network service can be implemented in accordance with one or more embodiments. For example, in the context of FIG. 1A, network service 150 can be implemented on a computing system 600 such as shown with an example of FIG. 6.

In one implementation, the computer system 600 includes processing resources 610, a main memory 620, a read-only memory (ROM) 630, a storage device 640, and a communication interface 650. The computer system 600 includes at least one processor 610 for processing information and a main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. The storage device 640, such as a solid-state device, a magnetic disk, or an optical disk, is provided for storing information and instructions. For example, the storage device 640 can correspond to a computer-readable medium that stores application instructions 642 for performing functions such as described with network service 150 (FIG. 1A) and with an example of FIG. 4. As described with an example of FIG. 4, the instructions 642 can include new functionality instructions ("NFI 641"), failure detection instructions ("FDI 643"), default mode instructions ("DM 645") and safe mode instructions ("SM 647").

The communication interface 650 can enable the computer system 600 to communicate with one or more networks 680 (e.g., cellular network) through use of the network link (wireless and/or using a wire). Using the network link, the computer system 600 can communicate with a plurality of devices, such as the mobile computing devices of the population of users. According to some examples, the computer system 600 can receive requests to which the computer system can provide the new functionality instructions 641. In some implementations, the computer system 600 can also provide failure detection instructions 643, default mode instructions 645 and safe mode instructions as part of an application download or update.

The computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to the computer system 600 for communicating information and command selections to the processor 610. Other non-limiting, illustrative examples of input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 600 for implementing the techniques described herein. According to one example, those techniques are performed by the computer system 600 in response to the processor 610 executing one or more sequences of one or more instructions contained in the main memory 620, such as the application instructions 642. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for operating a computing device to receive a network service, the method being implemented by one or more processors and comprising:
    launching an application that is linked to operate with the network service, wherein launching the application includes executing instructions for initiating the application on the computing device, and for communicating with one or more servers of the network service;
    receiving, from communicating with the one or more servers of the network service, instructions for implementing new functionality for the network service;
    storing new functionality information that is accessible to initiate the computing device in executing the instructions for implementing the new functionality when the application is re-launched;
    implementing one or more processes to monitor multiple types of application failures;
    in response to detecting an application failure of one of the multiple types of application failures, storing a data set which is indicative of the application failure;
    upon the application being initiated to re-launch, determining, based at least in part on the stored data set, that the application previously failed upon the instructions for implementing the new functionality being executed; and
    re-launching the application without accessing the new functionality information, so that the new functionality is not triggered.

2. The method of claim 1, wherein the multiple types of application failures includes the application terminating unexpectedly.

3. The method of claim 1, wherein the multiple types of application failures includes the application entering a suspended state of operation.

4. The method of claim 1, wherein implementing one or more processes to detect multiple types of application failures includes generating token data that includes (i) a first state indicating the application initiated, and (ii) a second state indicating the application successfully completed a runtime process in reaching a predetermined stage.

5. The method of claim 4, wherein the token data in the first state establishes a token, and wherein the token data in the second state removes the token from the computing device.

6. The method of claim 1, wherein the new functionality requires that the computing device access a specific server associated with the network service, and wherein the method further comprises determining that the specific server is available before attempting to re-launch the application with the new functionality.

7. The method of claim 6, wherein determining that the specific server is available includes receiving one or more messages indicating availability or unavailability of the specific server.

8. The method of claim 1, wherein determining that the application previously failed includes receiving one or more messages that indicate a particular failure or success of the application when the application was previously launched.

9. A method for changing functionality of a network service provided to a population of user computing devices, the method being implemented by one or more processors and comprising:
    providing an application for a population of computing devices operated by users, each computing device of the population being operable to run the application to receive the network service, wherein the application runs on each computing device to cause the application to (i) initiate on each computing device of the population, (ii) communicate over one or more networks with one or more servers that provide the network service, and (iii) perform tasks specified by the one or more servers;
    introducing a new functionality to the application on a given set of computing devices in the population when each computing device in the set launches the application; and
    providing instructions with the new functionality to each computing device in the set, including providing each computing device with: (i) new functionality instructions to cause the computing device to persistently store information for use when the application launches with introduction of the new functionality, (ii) failure detection instructions to cause the computing device to detect if launching the application with introduction of the new functionality causes the application to fail, (iii) default mode instructions to cause the computing device to implement a default mode re-launch process for the application that uses the stored information, and (iv) safe mode instructions to cause the computing device to implement a safe mode re-launch that omits use of the stored information if launching the application with introduction of the new functionality is detected as causing the application to fail on that computing device.

10. The method of claim 9, wherein the failure detection instructions cause each computing device of the set to detect if the application terminated unexpectedly.

11. The method of claim 9, wherein the failure detection instructions cause each computing device of the set to detect if the application enters into a suspended state of operation.

12. The method of claim 11, wherein the failure detection instructions cause each computing device of the set to generate token data that includes (i) a first default state indicating the application initiated, and (ii) a second state indicating the application successfully completed a runtime process in reaching a predetermined stage.

13. The method of claim 9, further comprising:
    collecting data when the new functionality is run on individual computing devices of the set to evaluate performance and/or failure of the new functionality.

14. The method of claim 9, further comprising:
    associating a temporary identifier to each computing device of the population, the temporary identifier of each computing device in the population being subject to reset based on an event or condition that occurs on that computing device; and
    selecting the computing devices of the set based on the temporary identifier.

15. The method of claim 9, further comprising:
    associating a temporary identifier to each computing device of the population, the temporary identifier of each computing device in the population being subject to reset based on an event or condition that occurs on that computing device; and using the temporary identifier to collect data from when the new functionality is run on individual computing devices of the set to evaluate performance and/or failure of the new functionality.

16. A non-transitory computer-readable medium that stores instructions which, when executed by one or more processors of a system, cause the system to perform operations that comprise:
   launching an application that is linked to operate with a network service, wherein launching the application includes executing instructions for initiating the application on a computing device, and for communicating with one or more servers of the network service;
   receiving, from communicating with the one or more servers of the network service, instructions for implementing new functionality for the network service;
   storing new functionality information that is accessible to initiate the computing device in executing the instructions for implementing the new functionality when the application is re-launched;
   implementing one or more processes to monitor multiple types of application failures;
   in response to detecting an application failure of one of the multiple types of application failures, storing a data set which is indicative of the application failure;
   upon the application being initiated to re-launch, determining, based at least in part on the stored data set, that the application previously failed upon the instructions for implementing the new functionality being executed; and
   re-launching the application without accessing the new functionality information, so that the new functionality is not triggered.

17. The non-transitory computer-readable medium of claim 16, wherein the multiple types of application failures includes the application terminating unexpectedly.

18. The non-transitory computer-readable medium of claim 16, wherein the multiple types of application failures includes the application entering a suspended state of operation.

19. The non-transitory computer-readable medium of claim 16, wherein implementing one or more processes to detect multiple types of application failures includes generate token data that includes (i) a first state indicating the application initiated, and (ii) a second state indicating the application successfully completed a runtime process in reaching a predetermined stage.

20. The non-transitory computer-readable medium of claim 16, wherein the new functionality requires that the computing device access a specific server associated with the network service, and wherein the system further comprises determining that the specific server is available before attempting to re-launch the application with the new functionality.

* * * * *